July 2, 1963  A. WOLFENSPERGER  3,096,070
PLUG VALVE CONSTRUCTION
Filed Sept. 6, 1956  5 Sheets-Sheet 1

INVENTOR
ADOLPH WOLFENSPERGER

BY Strauch, Nolan & Diggins
ATTORNEYS

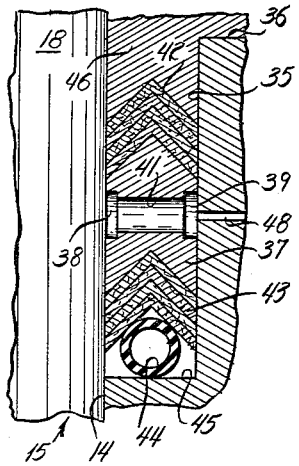
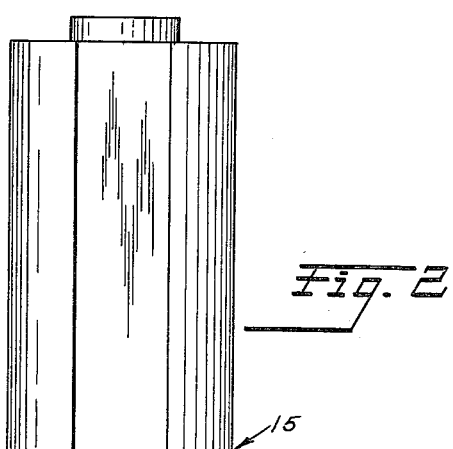
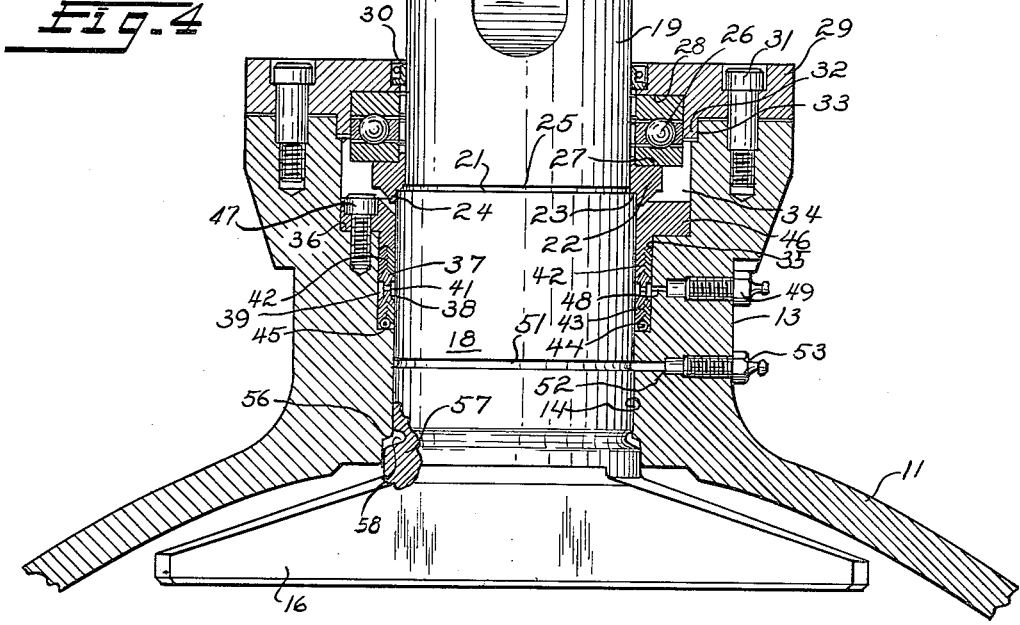
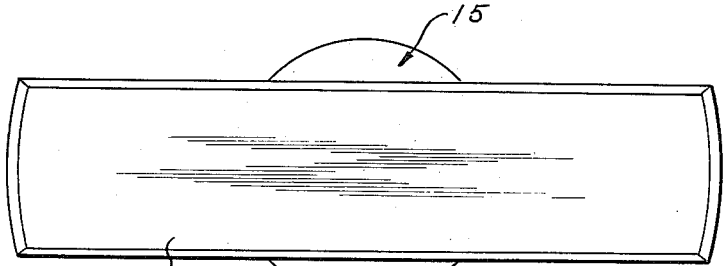

July 2, 1963  A. WOLFENSPERGER  3,096,070
PLUG VALVE CONSTRUCTION
Filed Sept. 6, 1956  5 Sheets—Sheet 3

INVENTOR
ADOLPH WOLFENSPERGER
BY Strauch, Nolan & Diggins
ATTORNEYS

INVENTOR
ADOLPH WOLFENSPERGER

BY

ATTORNEYS

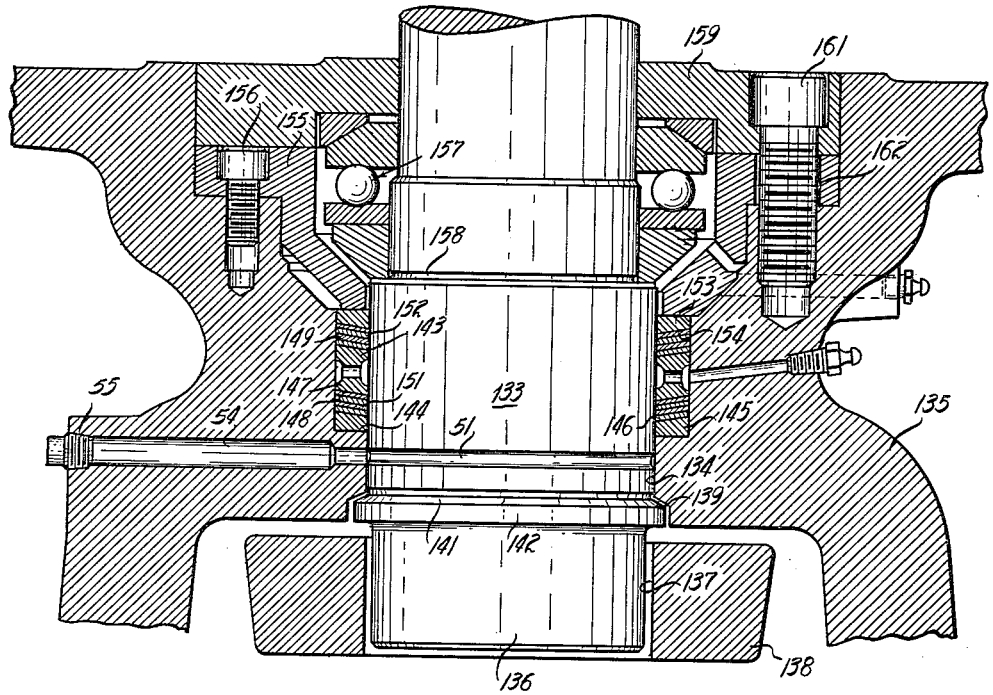
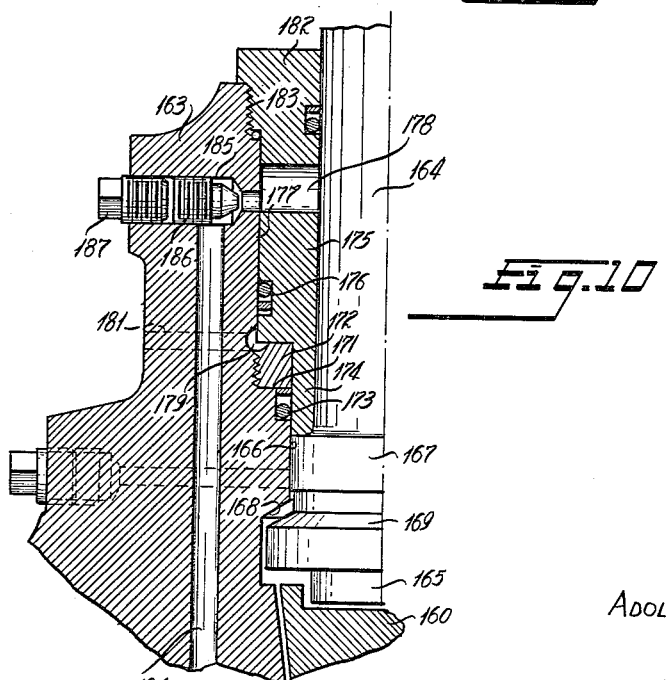

United States Patent Office 3,096,070
Patented July 2, 1963

3,096,070
PLUG VALVE CONSTRUCTION
Adolph Wolfensperger, Pittsburgh, Pa., assignor to Rockwell Manufacturing Company, Pittsburgh, Pa., a corporation of Pennsylvania
Filed Sept. 6, 1956, Ser. No. 608,246
1 Claim. (Cl. 251—214)

This invention relates to rotatable plug valves and particularly to arrangements for mounting and sealing their stems.

In plug valves such as disclosed in Nordstrom Patent No. 2,204,440 the rotatable valve stem is detachably connected to the plug inside the valve body and is rotatably mounted on the body by having a threaded section disposed within a correspondingly threaded body bore. Although in such valves the degree of rotation is only ninety degrees between fully open and closed positions and the threads have only a small lead the small axial shift resulting from rotation of the stem often introduces stem sealing problems because these valves are usually employed in high pressure fluid lines and the stems must be maintained sealed against leakage of line fluid.

Threadless plug valve stems have been proposed and actually shown in patents such as Humphreys 2,333,424 but the plug valve stems of this type in general usage today are all of the threaded variety These threaded stems must be accurately related to the threaded bore and the machining operations are relatively cumbersome and expensive especially with large valves. Moreover in dismantling the stem from the bore considerable work is entailed and a jammed thread may result in ruining an expensive structure. Furthermore in the threaded and other valve stems in general use today there is no provision for repacking the valve stem while maintaining high line pressures, and it is necessary to shut down the line and often disassemble the entire valve in order to examine or replace the valve stem seal.

The present invention relates to threadless plug valve stems and in its preferred embodiment will be described as incorporated in a ball valve assembly wherein the valve plug is a ball that is mounted on spherical zone seats such as disclosed in United States Letters Patent No. 2,788,015 issued April 9, 1957.

It is the major object of the present invention to provide a novel plug valve stem assembly wherein a threadless stem is efficiently rotatably mounted in the plug valve body and adequately lubricated and sealed against outward leakage of line fluid from the body.

It is a further object of the invention to provide a novel plug valve stem seal that is renewable under high pressure line conditions.

A further object of the invention is to provide a threadless plug valve stem that embodies a novel arrangement for holding the stem from being displaced outwardly of its mounting bore while the stem packing is being replaced or repaired.

It is a further object of the invention to provide a novel threadless stem and bearing arrangement in a plug valve.

Another object of the invention is to provide a novel threadless plug valve stem packing and sealing arrangement wherein lubricant under pressure is introduced into the packing and around the valve stem in its mounting bore.

A further object of the invention is to provide a threadless plug valve stem assembly having a novel back seat arrangement for holding the stem in line fluid sealing condition to permit renewal of the stem seal packing without shutting off the line pressure and/or replacing the stem bearing without disturbing the packing.

A further object of the invention is to provide a novel pressure balanced threadless plug valve stem assembly.

Further objects of the invention will presently appear as the description proceeds in connection with the appended claim and the annexed drawings wherein:

FIGURE 2 is a similar view taken at about right angles to FIGURE 1;

FIGURE 4 is an enlarged fragmentary view partly in section showing the stem packing assembly details;

FIGURE 5 is a chiefly sectional elevation showing an embodiment of the invention as used in a tapered plug valve;

FIGURE 9 is an enlarged fragmentary section showing still another stem valve seat construction; and FIGURE 10 is a fragmentary sectional view showing another embodiment of the invention wherein a load equalizing piston is provided to oppose line fluid leakage.

Figure 1:
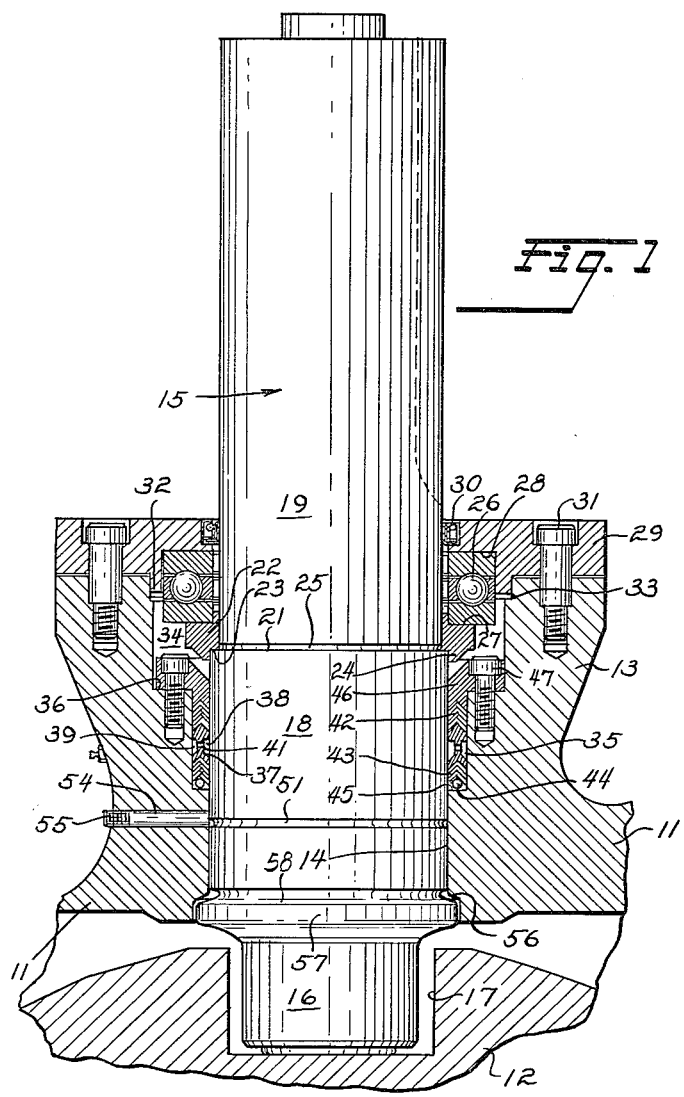
FIGURE 1 is an axial section through the upper end of a ball plug valve body illustrating particularly the details of the stem mounting and sealing and showing the lower end of the stem in the valve body.
Figure 3:
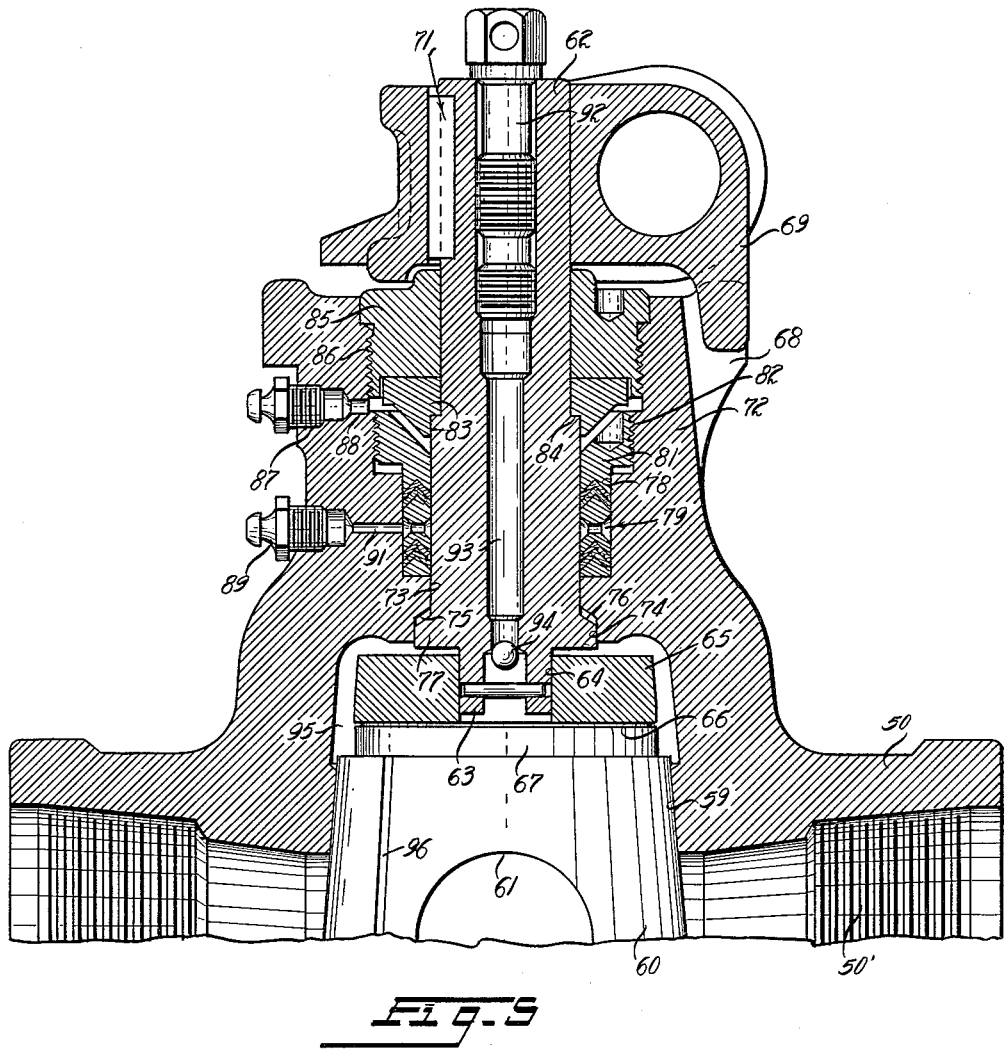
FIGURE 3 is a bottom plan view of the stem as mounted in FIGURE 1.

The main body housing 11 of the ball valve assembly that encloses the ball plug 12 is provided with an upwardly extending boss 13 formed internally with a smooth cylindrical bore 14. A valve stem 15 has a tang 16 at its lower end for detachable engagement with the slot 17 of ball plug 12 and is formed within bore 14 with a cylindrical section 18 that fits smoothly rotatably within bore 14 so as to be laterally supported thereby for rotation about the bore axis. The drawing in FIGURE 1 shows exaggeratedly a side clearance for tang 16 in slot 17 to permit relative shift of the ball 12 by line or lubricant pressure under certain conditions.

The upper end section 19 of stem 15 above that laterally supported in the bore is of somewhat reduced diameter to provide an annular upwardly facing shoulder 21. A collar 22 which comprises a heavy metal ring closely surrounds the stem and is formed with an annular downwardly facing shoulder 23 that seats on stem shoulder 21 in the assembly and a short annular depending lip 24 that surrounds the upper end of cylindrical stem section 18 in the assembly. Above shoulder 21 an annular groove 25 is formed in the stem.

A ball bearing assembly 26 has its lower race seated upon an upwardly facing shoulder 27 of collar 22 and its upper race seated upon a downwardly facing shoulder 28 of a cover plate 29 so that when cap screws 31 are drawn tight to secure cover plate 29 to the valve body bearing assembly 26 is effectively clamped between plate 29 and collar 22 and surrounded by depending cover skirt 32 which pilots into a recess 33 in the upper end of boss 13. Bearing assembly 26 thus serves as a thrust bearing for the valve stem 15 as well as radial support during normal operation. A dust seal 30 in cover 29 surrounds the valve stem above the bearing 26.

The interior of boss 13 at its upper ends is of appreciably larger diameter than at bore 14 to provide space 34 for the thrust bearing, and between that space and bore 14 there is a bore section 35 larger than bore 14 that provides a space for packing the stem and provides at the bottom of space 34 an upwardly facing ledge 36. A packing assembly is disposed essentially in the space between bore section 35 and the stem section 18 and comprises a rigid metal ring 37 having inner and outer continuous peripheral grooves 38 and 39 connected by a series of radial openings 41. Resilient V-type packing rings 42 and 43 are disposed above and below rigid ring 37 and an annular flexible packing ring 44 is compressed between lower resilient rings 43 and a ledge 45 at the bottom of bore section 35. A rigid packing retainer ring 46 has a skirt extending into bore section 35 formed with a downwardly facing V-grooved end to engage upper resilient packing 42 so that when cap screws 47 are drawn tight the packings will be sealingly compressed and expanded about the stem within bore section 35. Ring 46 could be threaded into bore section 35.

The outer groove 39 of ring 37 communicates with a check valved radial passage 48 that terminates in a lubricant introduction fitting 49 outside boss 13. Thus when lubricant, such as the usual plastic plug valve lubricant, is introduced under pressure through a check valve at 49 and passage 48 the grooves 38 and 39 are filled with the lubricant which thus provides an annular plastic seal in the grooves 38 and 39 about the valve stem and the lubricant also permeates the packing and spreads between the packing and stem surface 18 to provide lubrication to facilitate turning of the stem and to further seal against loss of line fluid pressure along the stem.

Below ledge 45 a narrow annular groove 51 is formed in the surface of stem section 18 and a check valved radial passage 52 is provided by which plastic lubricant may be introduced under pressure into groove 51 to spread axially along the interface between stem section 18 and bore 14 to further lubricate and seal the stem at its main bearing portion in the valve body. A lubricant fitting 53 is provided on the outer end of passage 52. As shown in FIGURE 1 a second radial passage 54 extends through boss 13 outwardly from groove 51 and is closed by a removable drain plug 55 which permits escape of any fluid leakage as the resilient packings are installed.

The lower end of bore 14 is enlarged for a short distance to provide a downwardly facing smooth annular valve seat 56 that is adapted to coact with an enlarged rim 57 on the lower end of the stem above the tang 16 to limit and hold to a small amount the outward axial displacement of stem 15 and prevent leakage of line fluid should cover plate 29 be removed as to replace or examine either bearing assembly 26 or the packing in the space within bore section 35. When the valve stem moves outwardly under line pressure engagement of smooth annular valve seat 58 with seat 56 to which it conforms in shape provides a back seat shut off against outward leak of line pressure, and the film of lubricant about the stem section 18 aids in making the seal complete.

The invention provides a plug valve assembly wherein the threadless stem undergoes no axial displacement during normal operation and does not change the seal effected by the resilient packings in bore section 35. The pressure exerted by line fluid within the valve body tending to outwardly displace the stem is carried by thrust bearing 26 during normal operation so that the effect of such pressure on the torque required to turn the stem is reduced to a minimum. The resilient packings in bore section 35 may be inspected, repaired or replaced without shutting off the line pressure or taking the valve out of the line, by removing cover 29, bearing assembly 26, collar 22 and ring 46. The upper resilient packing ring 42 may then be forced up by increasing lubricant pressure through passage 48. During such conditions the annular valve seating at 56, 58 shuts off outward escape of line pressure and is held tight by that line pressure, and the lubricant distributed along and about the stem from groove 51 maintains a secondary line fluid pressure tight seal effective should there be a leak through valve seats 56, 58. A quite advantageous feature is that bearing assembly 26 may be inspected or replaced by removing cover 29 without in any way disturbing the stem seal. The assembly is easy to assemble and dismantle, and the costs of manufacture and precision of fit in assembly are much less than the threaded stems in use today.

While in the foregoing the threadless valve stem is described as applied to a ball valve, it will be appreciated that this stem may be used without departing from the spirit of the invention upon a tapered or cylindrical plug valve or the like such as shown for example in Nordstrom Patent No. 2,204,440.

Referring to FIGURE 5, valve casing 50 is formed with a through passage 50' for line fluid intersected at right angles by a tapered bore 59 in which is rotatably seated a tapered plug 60 having a port 61 adapted when rotated 90° from the illustrated position to register with passage 50' and thus fully open the valve.

A valve stem 62 is formed at its lower end with a non-circular portion 63 mounted axially-free in a long straight slot 64 of a floating equalizer coupling member 65 which has a bottom slot 66 at right angles to slot 64 and fitting over a correspondingly shaped rib 67 rigid with the small end of plug 60. This may be the type of valve shown in Nordstrom Patent No. 2,204,440. Thus when valve stem 62 is rotated the plug 60 is turned in its seat between limits defined by lug such as 68 on the casing and an operator 69 non-rotatably secured as by key and slot connection 71 to stem 62.

Valve casing 50 has an upwardly open integral boss 72 surrounding valve stem 62 and a bore 73 is provided in the boss closely rotatably surrounding stem 62. The lower end of bore 73 is enlarged at 74 providing a downwardly facing smooth annular valve seat 75 that is adapted to coact with the corresponding upwardly facing annular seat 76 of enlarged rim 77 on the lower end of stem 62 above the plug driving portion 63.

Bore 73 is provided with an enlarged cylindrical length 78 in which is disposed an annular packing assembly 79 that is essentially the same as that disclosed in FIGURE 4, and a gland 81 threaded in boss 72 at 82 axially contains packing assembly 79. Spaced upwardly of gland 81 a thrust bearing unit 83 is seated on a stem shoulder 84 beneath a retainer cap 85 threaded into the top of the boss at 86. When cap 85 is drawn tight seats 75 and 76 are spaced. Lubrication for the bearing 83 is provided by a fitting 87 and passage 88. A lubricant introduction fitting 89 is provided at a passage 91 leading to the outer groove of the packing metal ring corresponding to ring 37 of FIGURE 4.

Interiorly stem 62 is threaded to receive a lubricant screw 92 which when rotated displaces lubricant from chamber 93 through check valve 94 into the space 95 at the small end of the plug and thence through grooves such as 96 to the plug seats for sealing and packing.

Thus in this embodiment of the invention also when cap 85 is removed as to replace the bearing or to remove gland 81 to repack at 79, the upward displacement of valve stem 62 due to line pressure entering space 95 will cause tight closure of the valve seats 75 and 76 and prevent outward fluid leakage so that no shutdown of the plug valve line is needed on this occasion.

Figure 6:
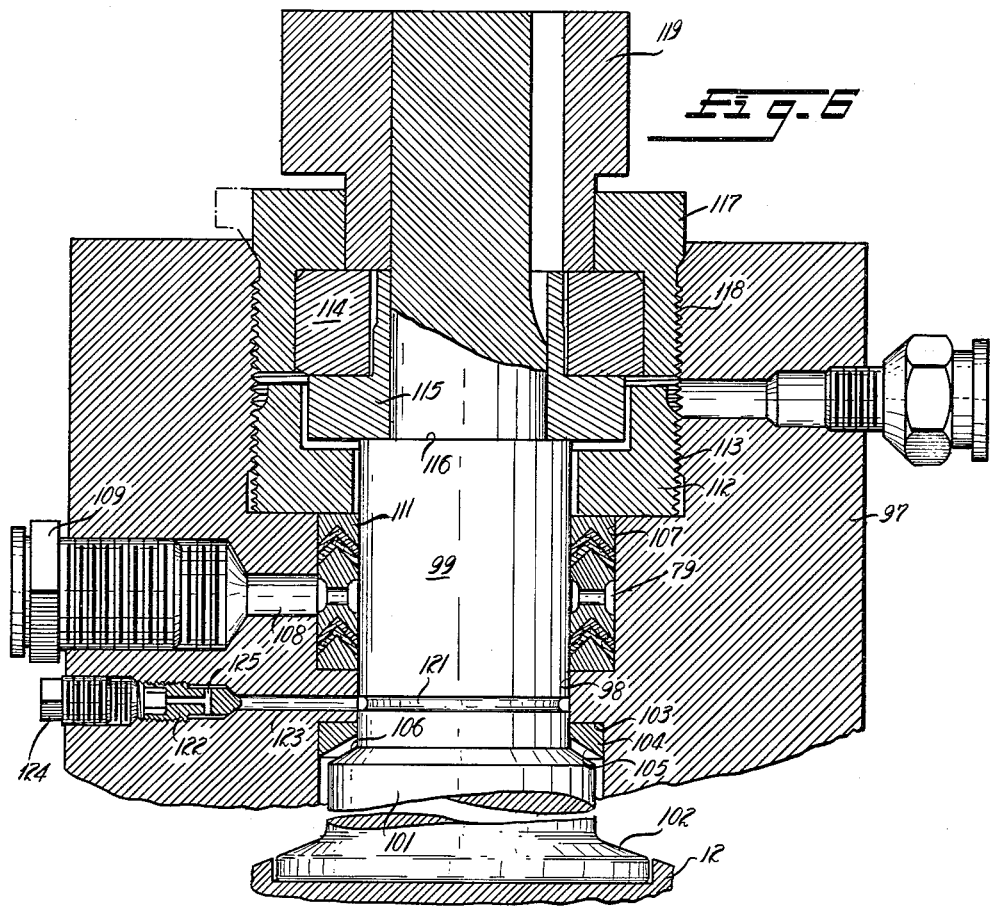
FIGURE 6 is a fragmentary section showing a different type of stem seat and other details according to a further embodiment of the invention.

FIGURE 6 shows an embodiment of the invention wherein a boss 97 on the plug valve casing has a smooth cylindrical bore 98 closely rotatably surrounding a valve stem 99 which is enlarged at its lower end at 101 and provided with a tang 102 interfitting with a valve plug such as a ball like FIGURE 1.

Bore 98 is enlarged at its lower end to provide a shoulder 103 in which is press fitted a soft iron ring 104 having an annular valve seat face 105 adapted to be engaged by the harder steel annular valve face 106 on the valve stem.

The bore 98 is upwardly enlarged at 107 to define a space for receiving a packing assembly 79 such as above described having the outer groove of its metal ring connected by passage 108 to a lubricant fitting 109. A spacer ring 111 engages the top compressible annulus of the assembly 79 and is in turn held in place by a gland 112 threaded into the boss at 113.

A bronze or like bearing metal bearing ring 114 is axially mounted between a ring 115 shouldered on the valve stem at 116 and a cap 117 threaded at 118 in the top of boss 97, and when cap 117 is drawn tight the valve seat faces 105 and 106 are axially spaced. An operator 119 is non-rotatably keyed to the upper end of valve stem 99.

Below the packing 79, the valve stem is formed with an annular groove 121 like that at 51 in FIGURE 1 and an operable drain valve 122 is provided to close radial passage 123 to the groove. When threaded plug 124 is removed, access is gained to rotate threaded valve 122 to unseat it from the end of passage 123 and allow fluid escape through the valve passages 125.

When cap 117 is removed tendency of line fluid pressure to force stem 99 axially outwardly and leak is stopped when valve seats 105 and 106 are seated against each other.

Figure 7:
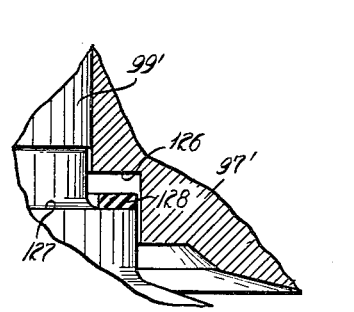
FIGURE 7 is another fragmentary sectional view showing a further embodiment of the invention.
Figure 8:
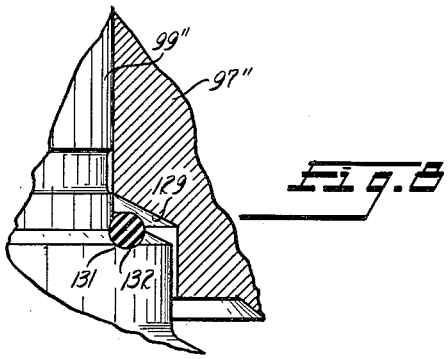
FIGURE 8 is an enlarged fragmentary section showing a stem valve seat according to a further embodiment.

FIGURES 7 and 8 show modified forms of valve stem seats usable in FIGURE 6 and any of the embodiments of the invention. In FIGURE 7 the valve body 97' is formed with a recessed shoulder having a flat downwardly facing axial valve seat surface 126 and the valve stem 99' with a flat annular radial upwardly facing shelf 127 supporting a resilient annulus 128 of rubber or the like. In FIGURE 8, the valve body 97" is formed at the bottom of the bore surrounding valve stem 99" with an inclined annular valve seat surface 129, and the valve stem is grooved at 131 to position a resilient annulus 132 of circular cross section commonly known as a rubber or like O-ring. In both FIGURES 7 and 8 the threadless valve stems are axially free as in the other embodiments when a retainer is removed as to renew a bearing or a packing, and outward displacement of the valve stem results in a resilient valve seating which seals off outward escape of line fluid. If desired either resilient valve seat annulus 128 or 132 may be cemented to the valve stem, or they may be used in reverse location, i.e. on the body.

FIGURE 9 shows a plug valve according to a further embodiment of the invention wherein the valve stem 133 is closely rotatably surrounded by bore 134 of the plug valve casing 135. A tang 136 on the bottom of the valve stem fits with a slot 137 in the valve plug 138 to be rotated. As in the other embodiments bore 134 is enlarged at its lower end to provide an annular downwardly facing valve seat 139 that is adapted to coact with annular upwardly facing valve seat 141 on the enlarged rib 142 on the valve stem.

A packing assembly 143 surrounds the valve stem above groove 51 in a space having a shoulder 144 supporting a rigid ring 145 having a face 146 sloping toward the valve stem. The rigid ring 147 of this packing has upper and lower faces 148 and 149 parallel to surface 146. Stacks of compressible annuli 151 and 152 respectively are provided below and above ring 147 and a top rigid ring 153 having a stack engaging face 154 parallel to face 146. The metal and compressible rings are held in tight axial assembly by a gland 155 secured in place by a series of cap screws 156 on the valve body. A ball bearing assembly 157 has its lower race shouldered on the valve stem at 158 and its upper race engaged by a cap or cover plate 159 removably secured to the valve body as by cap screws 161 that pass freely through openings 162 in the gland 155. When cap screws 161 are drawn tight the valve faces 139 and 141 are spaced axially.

From the foregoing it will be observed that in all of the species of the invention the bearings of the threadless valve stem may be safely removed without removing the stem packings, and without danger of escaping line fluid because of the valve closure, as at 139 and 141, which results when line pressure moves the valve stem axially outwardly.

Referring to FIGURE 10 the valve body 163 surrounds the valve stem 164 which has its lower end tang 165 engaged with the slotted plug 160 as in the other embodiments. The body bore 166 surrounds and closes rotatably encloses the cylindrical stem section 167, and at the bottom of the bore it is enlarged to provide downwardly facing annular valve seat 168 adapted to be engaged by upwardly facing annular valve seat 169 on the stem 164.

The body bore is recessed at 171 to receive a threaded insert ring 172 for retaining an annular piston packing 173 against the depending skirt 174 of an annular piston 175 which has a sealing piston ring 176 coacting with the cylindrical bore wall 177 defining a piston chamber 178. Piston 175 is axially slidable on the valve stem 164. Insert ring 172 serves as a stop to bottom the piston, and an annular passage 179 is cut away at its juncture with the piston chamber to communicate with a radial air vent passage 181. Skirt 174 serves as a stop for valve stem 164.

The top of chamber 178 is closed by a cap 182 threaded at 183 into the top of the chamber and sealed internally and externally with the body and stem respectively.

A lubricant passage 184 which connects to the source of lubricant pressure for supplying sealing and packing lubricant to the valve plug seat grooves is provided opening into a bore 185 that communicates with the chamber 178 above piston 175, and a throttling valve 186 is threaded in bore 185 so as to be adjustable to regulate admission of lubricant into the piston chamber. The outer end of bore 185 is closed by a plug 187.

In operation the full lubricant pressure from the reservoir is transmitted into chamber 178 where it acts downwardly on piston 175 to restrain valve stem 164 against upward axial displacement and this normally maintains valve seat surfaces 168 and 169 in axially spaced relation and counterbalancing the axial load exerted on the stem by line fluid pressure so that no thrust bearing is needed in this construction. The area of piston 175 exposed to chamber 178 should be equal to and preferably greater than the cross-sectional area of the valve stem exposed to line fluid pressure, and in any event the product of the lubricant pressure and the annular piston area should be equal to or slightly greater than the product of the line pressure times the stem cross-sectional area at 167 whereby the piston equalizes the thrust load on the stem during operation.

When the cap 182 is to be removed the valve 186 is first turned to close access of bore 185 to chamber 178, and as the stem 164 tends to move out under line pressure the valve seat surfaces 168 and 169 engage to stop such movement and seal against outward leakage of line fluid.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A plug valve assembly comprising a casing in which a valve plug is rotatably mounted, an outwardly open bore in said casing, a plug operating stem projecting slidably and rotatably through said bore, said stem being journalled in said bore on cooperating cylindrical surfaces, cooperating annular seats on the stem and said bore, a retainer surrounding said stem removably secured over the outer end of said bore to retain said stem against displacement outwardly of the bore and retain said seats in spaced relation during normal operation, a stem packing within said bore axially outwardly of said annular stem seat, means within the bore independent of said retainer for axially compressing said packing about the stem, an annular groove in one of said journal surfaces located between the packing and the annular seat on the stem, a passage in said casing in communication with said groove for bleeding off excess fluid pressure trapped in said groove when the stem packing has been removed, and control means in said passage.

References Cited in the file of this patent

UNITED STATES PATENTS

| | | |
|---|---|---|
| 1,352,548 | Shelton | Sept. 14, 1920 |
| 1,905,684 | Coffman | Apr. 25, 1933 |
| 2,628,112 | Hebard | Feb. 10, 1953 |
| 2,634,946 | Mueller | Apr. 14, 1953 |
| 2,647,720 | Volpin | Aug. 4, 1953 |
| 2,647,721 | Volpin | Aug. 4, 1953 |